(12) United States Patent
Zawistowski

(10) Patent No.: US 8,309,156 B2
(45) Date of Patent: Nov. 13, 2012

(54) COMPOSITIONS COMPRISING ONE OR MORE PHYTOSTEROLS AND/OR PHYTOSTANOLS, OR DERIVATIVES THEREOF, AND HIGH HLB EMULSIFIERS

(75) Inventor: Jerzy Zawistowski, Vancouver (CA)

(73) Assignee: Pharmachem Laboratories, Inc., Kearny, NJ (US)

( * ) Notice: Subject to any disclaimer, the term of this patent is extended or adjusted under 35 U.S.C. 154(b) by 836 days.

(21) Appl. No.: 11/613,970

(22) Filed: Dec. 20, 2006

(65) Prior Publication Data

US 2007/0141224 A1     Jun. 21, 2007

Related U.S. Application Data

(60) Provisional application No. 60/751,878, filed on Dec. 20, 2005, provisional application No. 60/790,749, filed on Apr. 10, 2006.

(51) Int. Cl.
*A23P 1/08* (2006.01)
*A23D 9/007* (2006.01)

(52) U.S. Cl. .................. 426/611; 426/326

(58) Field of Classification Search .......... 426/611, 426/326
See application file for complete search history.

(56) References Cited

U.S. PATENT DOCUMENTS

| | | | |
|---|---|---|---|
| 3,881,005 A * | 4/1975 | Thakkar et al. | 514/182 |
| 4,195,084 A | 3/1980 | Ong | |
| 4,420,427 A | 12/1983 | Hamunen | |
| 5,770,749 A | 6/1998 | Kutney et al. | |
| 5,932,562 A | 8/1999 | Ostlund, Jr. | |
| 6,033,710 A * | 3/2000 | Miller et al. | 426/564 |
| 6,054,144 A | 4/2000 | Burruano et al. | |
| 6,063,776 A | 5/2000 | Ostlund | |
| 6,110,502 A | 8/2000 | Burruano et al. | |
| 6,129,944 A | 10/2000 | Tiainen et al. | |
| 6,190,720 B1 | 2/2001 | Yuan et al. | |
| 6,267,963 B1 | 7/2001 | Akashe et al. | |
| 6,274,574 B1 | 8/2001 | Akashe et al. | |
| 6,376,482 B2 | 4/2002 | Akashe et al. | |
| 6,410,073 B1 * | 6/2002 | McPherson et al. | 426/549 |
| 2003/0144536 A1 | 7/2003 | Sonnier et al. | |
| 2003/0165572 A1 * | 9/2003 | Auriou | 424/493 |
| 2006/0035871 A1 * | 2/2006 | Auweter et al. | 514/169 |

FOREIGN PATENT DOCUMENTS

| | | |
|---|---|---|
| CA | 2230373 | 8/1998 |
| DE | 2035069 | 1/1971 |
| EP | 0897671 A1 | 2/1999 |
| EP | 0986962 A1 | 3/2000 |
| EP | 1082029 | 3/2001 |
| EP | 1142494 A1 | 10/2001 |
| EP | 1233681 A1 | 8/2002 |
| EP | 1315482 A2 | 6/2003 |
| EP | 1455588 | 9/2004 |
| JP | 2000-102361 | 4/2000 |
| WO | 9858554 | 12/1998 |
| WO | 0033669 | 6/2000 |
| WO | 0041491 | 7/2000 |
| WO | 0045648 | 8/2000 |
| WO | 03055324 A1 | 7/2003 |
| WO | 03077680 A1 | 9/2003 |
| WO | 03105611 | 12/2003 |

OTHER PUBLICATIONS

Law MR, Wald NJ, Wu T, Hacksaw ZA, Bailey A; Systemic underestimation of association between serum cholesterol concentration and ischemic heart disease in observational studies: Data from BUPA Study; Br.Med. J. 1994; 308:363-366.

Law MR, Wald NJ, Thompson SG; By how much and how quickly does reduction in serum cholesterol concentration lower risk of ischemic heart disease? Br. Med. J. 1994; 308:367-373.

Kannel WB, Castelli WP, Gordon T et al.; Lipoprotein cholesterol in the prediction of atherosclerotic disease: new perspectives based on the Framingham Heart Study. Ann Intern Med. 1995;90:85-91.

Singh Bk, Mehta JL; Management of dyslipidemia in the primary prevention of coronary heart disease. Curr Opin Cardiol. 2002;17:503-11.

La Rosa JC, Hunninghake D, Bush D et al.; The cholesterol facts: A summary of the evidence relating to dietary fats, serum cholesterol and coronary heart disease: A joint statement by the American Heart Association and the National Heart, Lung and Blood Institute. Circulation 1990;81:1721-1733.

Havel RJ, RapaportE; Drug Therapy: Management of Primary Hyperlipidemia. New England Journal of Medicine; 1995; 332:1491-1498.

Kuccodkar et al.; Effects of plant sterols on cholesterol metabolism. Atherosclerosis, 1976; 23:239-248.

Lees RS, Lees AM; Effects of sitosterol therapy on plasma lipid and lipoprotein concentrations. In: Greten H (Ed) Lipoprotein Metabolism. Springer-Verlag, Berlin,Heidelberg, New York, 1976:119-124.

Lees AM, Mok Hyi, Lees RS, McCluskey MA, Grundy SM. Plant sterols as cholesterol-lowering agents: clinical trials in patients with hypercholesterolemia and studies of sterol balance. Atherosclerosis; 1977;28:325-338.

* cited by examiner

*Primary Examiner* — Carolyn Paden
(74) *Attorney, Agent, or Firm* — Kirton McConkie; Evan R. Witt

(57) ABSTRACT

A composition for use in foods, beverages and nutraceuticals that includes one or more non-sterol emulsifiers, each having an HLB value of greater than 14 and one or more sterols or stanols or mixtures thereof.

9 Claims, 3 Drawing Sheets

COMPOSITIONS COMPRISING ONE OR MORE PHYTOSTEROLS AND/OR PHYTOSTANOLS, OR DERIVATIVES THEREOF, AND HIGH HLB EMULSIFIERS

CROSS-REFERENCE TO RELATED APPLICATION

This application claims the benefit of U.S. Provisional Patent Application 60/751,878, filed Dec. 20, 2005, and U.S. Provisional Patent Application 60/790,749, filed Apr. 10, 2006.

FIELD OF THE INVENTION

This present invention relates to the field of compositions comprising specific naturally derived hydrophobic compounds, particularly sterols and stanols of plant or marine origin, and the means by which such sterols or stanols or their esters can be readily incorporated into delivery vehicles such as food, beverages, nutraceuticals and pharmaceuticals.

BACKGROUND OF THE INVENTION

While recent advances in science and technology are helping to improve quality and add years to human life, the prevention of atherosclerosis, the underlying cause of cardiovascular disease ("CVD") has not been sufficiently addressed. Atherosclerosis is a degenerative process resulting from an interplay of inherited (genetic) factors and environmental factors such as diet and lifestyle. Research to date suggest that cholesterol may play a role in atherosclerosis by forming atherosclerotic plaques in blood vessels, ultimately cutting off blood supply to the heart muscle or alternatively to the brain or limbs, depending on the location of the plaque in the arterial tree[1,2]. Data from the early Framingham Epidemiological Study indicates that increases in serum cholesterol levels are associated with increased risk of death from CVD[3]. More recent studies confirm that CVD is a leading cause of death and disability in industrialized nations[4].

Studies have indicated that a 1% reduction in a person's total serum cholesterol yields a 2% reduction in risk of a coronary artery event[5]. Statistically, a 10% decrease in average serum cholesterol (e.g. from 6.0 mmol/L to 5.3 mmol/L) may result in the prevention of 100,000 deaths in the United States annually[6].

As the population becomes increasingly aware of the importance of maintaining cholesterol balance in check, the need for naturally derived, safe and effective agents which address the underlying causes of CVD, and which can be readily incorporated into a wide variety of delivery means, becomes even more apparent.

One focus of such research related to naturally derived, safe and effective agents to address the underlying causes of CVD has been plant-derived sterols and stanols (also known as phytosterols and phytostanols). Sterols are naturally occurring compounds that perform many critical cellular functions. Phytosterols such as campesterol, stigmasterol and beta-sitosterol in plants, ergosterol in fungi and cholesterol in animals are each primary components of cellular and sub-cellular membranes in their respective cell types. The dietary source of phytosterols in humans comes from plant materials i.e. vegetables and plant oils. The estimated daily phytosterol content in the conventional western-type diet is approximately 60-80 milligrams in contrast to a vegetarian diet which would provide about 500 milligrams per day.

Phytosterols have received a great deal of attention due to their ability to decrease serum cholesterol levels when fed to a number of mammalian species, including humans. While the precise mechanism of action remains largely unknown, the relationship between cholesterol and phytosterols is apparently due in part to the similarities between the respective chemical structures (the differences occurring in the side chains of the molecules). It is assumed that phytosterols displace cholesterol from the micellar phase and thereby reduce its absorption or possibly compete with receptor and/or carrier sites in the cholesterol absorption process.

Over forty years ago, Eli Lilly marketed a sterol preparation from tall oil and later from soybean oil called Cytellin™ which was found to lower serum cholesterol by about 9% according to one report[7]. Various subsequent researchers have explored the effects of sitosterol preparations on plasma lipid and lipoprotein concentrations[8] and the effects of sitosterol and campesterol from soybean and tall oil sources on serum cholesterols.[9] Compositions have been explored in which phytosterols or phytostanols (their hydrogenated counterparts) are esterified in order to enhance solubility. One composition of phytosterols which has been found to be highly effective in lowering serum cholesterol is disclosed in U.S. Pat. No. 5,770,749 to Kutney et al.

Despite the obvious and now well recorded advantages of phytosterols, not only in the treatment of CVD and its underlying conditions such as hypercholesterolemia, hyperlipidemia, atherosclerosis, hypertension, thrombosis but in the treatment of other diseases such as Type II diabetes, dementia cancer and aging, the administration of phytosterols and the incorporation thereof into foods, pharmaceuticals and other delivery vehicles has been complicated by the fact that they are highly hydrophobic (i.e. they have poor water solubility). This highly hydrophobic nature of phytosterols renders them insoluble and barely dispersible in aqueous media. As such, phytosterols tend to be added to the fat phase of fat-based food products. Health-conscious consumers wishing to benefit from the cholesterol lowering effects of phytosterols are therefore forced to consume fat-rich foods, despite the health risks of a high fat diet.

In addition, and critically in the area of food and beverage production, phytosterols have a waxy consistency and a high melting point, creating solubility issues for the food processor. While they are oil-dispersible to some extent in their raw form, the amount required to produce an efficacious effect in a finished product can cause granulation. The current answer to this problem is esterification, which creates something of an equilibrium between the phytosterols and liquid oil. Due to these physical property limitations of phytosterols, their use by food manufacturers has been limited to fat-based products like margarine, salad dressings and, most recently, snack bars.

Furthermore, studies have investigated how the form (for example crystalline, suspension, granular) in which the phytosterols are dosed impacts on their ability to lower serum cholesterol levels. As phytosterols are highly hydrophobic, they do not dissolve to any appreciable extent in the micellar phase in the digestive tract and therefore are not capable of efficiently blocking cholesterol absorption. Oils and fats are capable to a limited but not satisfactory degree of dissolving free phytosterols. Only substantially solubilized phytosterols appear inhibit the absorption of cholesterol.

As noted above, since phytosterols have high melting points (typically about 136-150° C.) it is important to maintain a temperature of 80° C. or higher during dissolution of phytosterols in fats or oils, in order to avoid recrystallization of the phytosterols. Crystalline phytosterol imparts an unpleasant grainy, waxy texture to edible and topical products. However, at 80° C. and above commonly used fats and oils are vulnerable to oxidation. Rancid oils and fats detract greatly from the organoleptic properties of food products in particular. Hence there is a need to address the issue of this waxy texture in order to make any deliverable foods and beverages palatable and marketable.

The problems associated with adding phytosterols to the fat phase are compounded in low fat, fat-based products and in non-fat products. The amount of phytosterol capable of being dispersed in the fat phase of a fat-based emulsified product directly correlates with the amount of lipid in the product. Thus, when the lipid content is reduced to below a certain level it becomes technically impossible to incorporate enough phytosterol into an edible product to obtain a tangible health benefit. The problems posed by the need to disperse phytosterols in fat become more acute the lower the fat content of a fat-based product.

Early research on phytosterols focused on grinding or milling the phytosterols in order to enhance their solubility (U.S. Pat. Nos. 3,881,005 and 4,195,084 both to Eli Lilley). In addition, researchers have looked to the esterification of phytosterols in order to enhance their solubility. German Patent 2035069/Jan. 28, 1971 (analogous to U.S. Pat. No. 3,751,569) describes the addition of phytosterol fatty acid esters to cooking oil. The esterification is carried out between a free sterol and a fatty acid anhydride, with perchloric acid as the catalyst. The significant drawback to this process, along with others, is the use of non-food grade catalysts and reagents.

Conventionally, phytosterols have been incorporated into food products by melting a sterol or stanol, incorporating it into an oil phase, and blending the oil phase with other components to result in a phytosterol-containing food product. However, the aforementioned high melting points can result in significant crystallization of the phytosterols within the oil phase of such food products. Such crystallization results in food products with a gritty and unacceptable texture. This gritty texture is especially detectable when the oil/plant sterol phase is incorporated at high levels in the food product. The high melting points and hydrophobic nature of such phytosterols also make it difficult to blend such them with an aqueous phase. Furthermore, actual melting of the plant sterol for incorporation into food products is energy intensive.

Attempts have been made to solve these problems using, for example, chemical modification of the phytosterols. For example, as noted above, esterification of phytosterols generally results in lowered melting temperatures. Thus, such phytosterol esters generally may be incorporated into food products more readily due to the lower melting points and can provide food products without significantly gritty texture. Although the problem of fat solubility of phytosterols can be improved by esterification, this is not a completely satisfactory solution to the problem for two reasons: 1) phytosterol esters are biologically less effective than non-esterified phytosterols; and 2) when a phytosterol or phytosterol ester is distributed within the small volume lipid phase of a low fat emulsified product, the taste of the product is adversely affected, since the high concentration of phytosterol in the fat leads to a waxy sensation in the mouth and on the tongue.

Within the last 6-8 years, several different approaches have been used to incorporate plant sterols into food products. For example, European Patent Application EP 0 896 671 A (published Feb. 24, 1999) provides an aqueous dispersion of phytosterols by melting the phytosterols and emulsifiers to form a molten mixture and then dispersing the molten mixture in water using high shear. It was reported "that the step of melting the high melting phytosterols with surfactant prior to dispersion in water with or without surfactant contributes importantly to the ability to prepare a very fine dispersion with the use of high shear mixing or homogenization of the phytosterol or othermelting lipid". The phytosterols are reported to have particle sizes of less than 15 microns and preferably less than 10 microns in aqueous dispersions. Such phytosterol dispersions could be incorporated into food products without the grittiness normally associated with phytosterols.

In WO2003105611, Coca Cola attempted to address the issue of incorporating highly hydrophobic compounds, such as phytosterols, into fruit beverages. It is noted in the application that "since hydrophobic ingredients have a different density than water and as a result, at the time of purchase and consumption of the product, a hydrophobic component may separate and float to the surface or sink to the bottom. The hydrophobic component that floats to the surface produces undesirable "ringing," which is found in beverages, such as juices containing a hydrophobic ingredient with a density less than water, and results in a product that is non-uniform throughout the container." Coca Cola has attempted to solve this problem by creating aqueous sterol dispersions without any added emulsifiers or thickening agents.

Earlier researchers attempted to overcome formulation limitations in relation to phytosterols by using several methods including: homogenization, encapsulation, and/or the addition of stabilizers, gums and the like. However, these methods increase the cost of the product, and in some instances are illegal in certain standardized products such as citrus juices.

Tiainen et al., U.S. Pat. No. 6,129,944 describes a method for producing a product containing a plant sterol by forming a homogeneous suspension of a microcrystalline plant sterol and a sweetening agent in an aqueous solution.

Vulfson et al., WO 00/41491 discloses hydrophobic compounds such as plant sterols and lycopenes as supplements to food products and beverages such as oleomargarine products, drinks, soups, sauces, dips, salad dressings, mayonnaise, confectionery products, breads, cakes, biscuits, breakfast cereals and yogurt type products. Vulson et al., in combining the plant sterol or lycopene with the food product, theorizes that the food product which has both hydroxyl and carboxyl groups interacts with the surface of the sterol or lycopene.

Haarasilta et al., WO 98/58554, describes a premix used in the food industry containing a pulverized plant sterol and a conventional foodstuff ingredient such as fruit, vegetable or berry type of material, particularly in a powder form and methods for preparing the premix.

Zawistowski, WO 00/45648, describes a method of preparing microparticles of plant sterols and plant stanols or mixtures of both by dispersing and suspending the plant sterols and plant stanols in a semi-fluid, fluid or viscous vehicle and exposing the vehicle so formed to impact forces. The method involves dispersing or otherwise suspending the plant sterol and/or plant stanol in a suitable semi-fluid, fluid or viscous vehicle followed by applying impact forces to the vehicle to produce microparticles. Zawistowski develops these impact forces by creating high-shear either with an air atomization nozzle, a pneumatic nozzle, a high-shear mixer, or colloid mill, but preferably a microfluidizer commercially available from Microfluidics Incorporation, Newton, Mass. Zawistowski observed that the plant sterols and/or plant stanols prepared in this way have greater "solubility" not only in oil based delivery systems but also in other media and can be incorporated into beverages such as colas, juices or dietary supplement and/or milk replacement drinks.

In order to increase the solubility of plant sterol, some researchers have synthesized various derivatives of plant sterol. For example, sitosterol mixed in certain ratios with starch hydrolysate, silicon dioxide and polyoxylene sorbitan monostearate through homogenizing, deaeration, pasteurizing and evaporation steps to form a medicinal powder for oral application, as disclosed in U.S. Pat. No. 3,881,005.

U.S. Pat. No. 5,932,562 discloses an aqueous homogeneous micellar mix of a plant sterol, lecithin and lysolecithin which has been dried to a finely divided water soluble powder. Other water-soluble plant sterols can be found in U.S. Pat. Nos. 6,054,144 and 6,110,502. According to these patents, aqueous-dispersible plant sterol is produced by admixing oryzanol or plant sterol, a monofunctional surfactant and polyfunctional surfactant in water at fixed ratios, and drying the admixture. This production method is characterized by being free from homogenization and deaeration steps with adoption of polyoxylene sorbitan monopalmitate and sorbitan monopalmitate as a monofunctional surfactant and a polyfunctional surfactant, respectively.

U.S. Pat. No. 6,190,720 discloses a food ingredient that can be used as a cholesterol-lowering agent, teaching that the food ingredient can be prepared by combining one or more molten plant sterols with one or more fats and one or more emulsifiers to homogeneity and cooling the homogeneous mixture to about 60° C. under agitation to give a paste. This food ingredient can be applied to oil-based foods such as salad dressings, margarine, etc.

PCT WO 00/33669 teaches that plant sterols can be dissolved or mixed in a melt of a food emulsifier, admixed with protein-containing foods such as milk or yogurt, homogenized, and added to food products. The dispersion stability of the cholesterol reducing, edible products is maintained only in the presence of a protein-containing material.

U.S. Pat. No. 6,267,963 describes a plant sterol-emulsifier complex which has a melting temperature at least 30° C. below that of the plant sterol, characterized in that, due to its reduced melting temperature, the plant sterol-emulsifer is less likely to crystallize during or after the manufacture of food products, and can be incorporated into food products in an amount effective to reduce serum cholesterol levels in a human consuming the food products without unpleasant effects on the texture of the food products.

In view of the technical difficulties involved in adding phytosterols to foods and beverages, and bearing in mind the utility of being able to widely supplement a wide variety of comestible products with these components, it would be highly advantageous to find an effective means of dispersing or suspending phytosterols in aqueous media at high concentrations or in creating a means to deliver phytosterols in a manner which addresses the problems of waxiness and guminess attendant in the powder formulation, thereby opening up the possibility of providing low fat or fat-free products (i.e. aqueous based products) containing phytosterols in a variety of formats.

It is an object of the present invention to obviate or mitigate the above noted disadvantages and to find a solution for the problem plaguing manufacturers wishing to widely use hydrophobic compounds, such as phytosterols, in these varied formats.

SUMMARY OF THE INVENTION

The present invention provides a composition for use in foods, beverages and nutraceuticals comprising one or more non-sterol emulsifiers, each having an HLB value of greater than 14 and one or more sterols or stanols or mixtures thereof.

This invention further provides sterols or stanols or mixtures thereof mixed with one or more non-sterol emulsifiers, each having an HLB value of greater than 14 which are coated and spray dried for optimal food and nutraceutical usage.

The present invention further provides a method of reducing and/or preventing the unpleasant organoleptic and sensory qualities (including guminess and waxiness) of the incorporation of sterols and stanols and mixtures thereof into foods, beverages or nutraceuticals which comprises: a) preparing a premix of one or more sterols and/or stanols with one or more high HLB non-sterol emulsifiers; b) adding said premix into the desired food, beverage or nutraceutical.

The present invention provides a premix useful for incorporation in a variety of foods, beverages and nutraceuticals comprising one or more non-sterol emulsifiers, each having an HLB value of greater than 14 and one or more sterols or stanols or mixtures thereof.

The present invention further provides foods, beverages, and nutraceuticals formed with the addition or compositions as provided herein.

The present invention further provides a method for treating or preventing CVD and its underlying conditions including atherosclerosis, hypercholesterolemia, hyperlipidemia, hypertension, thrombosis, and related diseases such as Type II diabetes, as well as other diseases that include oxidative damage as part of the underlying disease process such as dementia, aging, and cancer by administering to an animal foods, beverages or nutraceuticals comprising one or more non-sterol emulsifiers, each having an HLB value of greater than 14 and one or more sterols or stanols or mixtures thereof.

The present invention provides a method of preserving a food product from both deterioration due to microbial growth which may be present within said food product, which comprises adding to the food product one or more sterols and/or stanols in combination with one or more non-sterol emulsifiers, each having an HLB value of greater than 14, or mixtures thereof.

The present invention further provides a food product comprising an anti-microbiologically effective amount of one or more sterols and/or stanols in combination with one or more non-sterol emulsifiers, each having an HLB value of greater than 14, or mixtures thereof.

In another aspect, the present invention provides a method of reducing the microbial contamination of a particulate food material which comprises mixing into or forming said food material with an anti-microbially effective amount of one or more sterols and/or stanols in combination with one or more non-sterol emulsifiers, each having an HLB value of greater than 14, or mixtures thereof.

In yet another aspect, the present invention provides a prepared food product comprising one or more sterols and/or stanols in combination with one or more non-sterol emulsifiers, each having an HLB value of greater than 14, or mixtures thereof, wherein said food product, after the processing steps to prepare the product and during storage before consumption, contains a reduced number of pathogenic and/or spoilage-causing microbes as compared to the same food product without such addition.

BRIEF DESCRIPTION OF THE DRAWINGS

The present invention is illustrated by way the following non-limiting drawings in which.

DETAILED DESCRIPTION OF THE INVENTION

Figure 1:
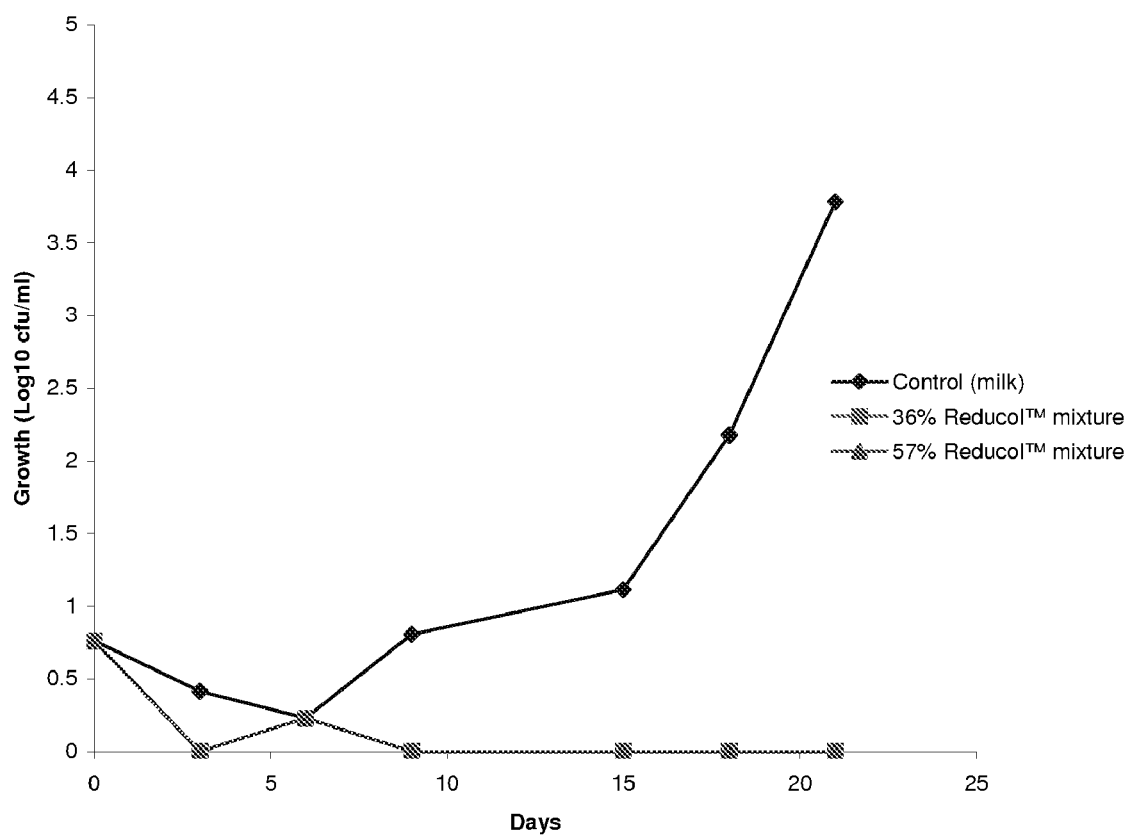
FIG. 1 is a graph showing the effect of dispersible Reducol™ mixture with high HLB emulsifiers on the psychrotrophic plate count in 1% m.f. milk stored at 4-7° C. Values are means of triplicate samples each performed in duplicate (n=6).

The following detailed description is provided to aid those skilled in the art in practising the invention. However this detailed description should not be construed so as to unduly limit the scope of the present invention. Modifications and variations to the embodiments discussed herein may be made by those with ordinary skill in the art without departing from the spirit or scope of the present invention.

As used herein, the term "sterol" includes all sterols without limitation, for example: (from any source and in any form: α, β and γ) sitosterol, campesterol, stigmasterol, brassicasterol (including dihydrobrassicasterol), desmosterol, chalinosterol, poriferasterol, clionasterol, ergosterol, coprosterol, codisterol, isofucosterol, fucosterol, clerosterol, nervisterol, lathosterol, stellasterol, spinasterol, chondrillasterol, peposterol, avenasterol, isoavenasterol, fecosterol, pollinastasterol, cholesterol and all natural or synthesized forms and derivatives thereof, including isomers.

The term "stanol" refers to, for example: (from any source and in any form: α, β and γ) saturated or hydrogenated sterols including all natural or synthesized forms and derivatives thereof, and isomers, including sitostanol, campestanol, stigmastanol, brassicastanol (including dihydrobrassicastanol), desmostanol, chalinostanol, poriferastanol, clionastanol, ergostanol, coprostanol, codistanol, isofucostanol, fucostanol, clerostanol, nervistanol, lathostanol, stellastanol, spinastanol, chondrillastanol, pepostanol, avenastanol, isoavenastanol, fecostanol, and pollinastastanol.

It is to be understood that modifications to the sterols and stanols i.e. to include side chains also falls within the purview of this invention. It is also to be understood that, when in doubt throughout the specification, and unless otherwise specified, the term "sterol" encompasses both sterol and stanol. The terms "phytosterol" and "phytostanol" may also be used and refer to all plant-derived sterols or stanols respectively.

The sterols and stanols for use in forming derivatives in accordance with this invention may be procured from a variety of natural sources or they may be artificially synthesized. For example, they may be obtained from the processing of plant oils (including aquatic plants) such as corn oil and other vegetable oils, wheat germ oil, soy extract, rice extract, rice bran, rapeseed oil, sunflower oil, sesame oil and fish (and other marine-source) oils. They may also be derived from yeasts and fungi, for example ergosterol. Accordingly, the present invention is not to be limited to any one source of sterols. U.S. Pat. No. 4,420,427 teaches the preparation of sterols from vegetable oil sludge using solvents such as methanol. Alternatively, phytosterols and phytostanols may be obtained from tall oil pitch or soap, by-products of forestry practises as described in U.S. Pat. No. 5,770,749, incorporated herein by reference. A further method of extracting sterols and stanols from tall oil pitch is described in Canadian Patent Application Serial No. 2,230,373 which was filed on Feb. 20, 1998 (corresponding to PCT/CA99/00150 which was filed on Feb. 19, 1999) and U.S. patent application Ser. No. 10/060,022 which was filed on Jan. 28, 2002 the contents of all of which are incorporated herein by reference.

Accordingly, it is to be understood that the widest possible definition is to be accorded to the terms "sterol" and "stanol" as used herein, including, but not limited to: free sterols and stanols, esterified sterols and stanols with aliphatic or aromatic acids (thereby forming aliphatic or aromatic esters, respectively), phenolic acid esters, cinnamate esters, ferulate esters, phytosterol and phytostanol glycosides and acylated glycosides or acylglycosides. Thus, the terms "sterols" and "stanols" encompasses all analogues, which may further have a double bond at the 5-position in the cyclic unit as in most natural sterols, or one or more double bonds at other positions in the rings (for example, 6, 7, 8(9), 8(14), 14 5/7) or no double bonds in the cyclic unit as in stanols. Further, there may be additional methyl groups as, for example, in $\alpha_1$-sitosterol.

Phytosterols and/or phytostanols once isolated from their source are generally formed into a solid powder through precipitation, filtration and drying, spray drying, lyophilization or by other conventional work-up techniques. It is this powder form which has, heretofore, provided many of the challenges in incorporating phytosterols into various food and beverages matrices i.e. stickiness of the powder, handling difficulties, sensory issues, waxiness, guminess, etc. . . . Within the scope of the present invention, it has been surprisingly found that when phytosterols are admixed with one or more high HLB emulsifiers, these handling and other sensory difficulties are overcome.

As used herein, the term "non-sterol emulsifier" is intended to encompass high HLB compounds, specifically emulsifiers with an HLB value of equal to or greater than 14. The HLB system is a scale used for describing the characteristics of a surface-active agent. Detailed information on the HLB system and determination of HLB values can be found in the Kirk-Othmer Encyclopedia of Chemical Technology, (3 Ed.) 8: pp 910-918, which is incorporated herein by reference. Emulsifiers having HLB values in the range 7 to 18, especially 8 to 18, are often termed oil in water (o/w) emulsifiers. W/o emulsifiers have HLB values in the range 1-9, especially 1-6. Since HLB numbers are additive, the overall HLB value of a blend of emulsifiers of known HLB can easily be calculated.

In one preferred form of the present invention, any non-sterol emulsifier used has an HLB value equal or greater than 17. In another preferred form of the present invention, any non-sterol emulsifier used has an HLB value equal or greater than 20. The most preferred non-sterol emulsifiers for use within this invention are traditional emulsifiers having an HLB in the range of about 16-25. The majority of emulsifiers falling into this category are ethoxylates, most frequently nonionic ethoxylated fatty acids, esters, sorbitan esters, oils and alkylphenols.

In general, such emulsifers include alkoxylate emulsifiers with an average of from about 10 to about 100 alkylene oxide, particularly ethylene oxide residues; and non-alkoxylate emulsifiers including sugar mono-esters and polyglycerol mono-esters, hydrocarbyl, especially alkyl, polysaccharides; fatty acid glycerol esters where the fatty acid has 8 to 12 carbon atoms such as glycerol mono-laurate and fatty acid N-sugar amides such as glucamides. However, any type of liquid emulsifier meeting the HLB requirement can be used. Examples of other emulsifiers of this type can be found in McCutcheon's, Vol 1: Emulsifiers & Detergents, 2000, the contents of which are incorporated herein by reference.

Specific examples of emulsifiers which may be selected in accordance with the present invention include, but are not limited to: sodium stearoyl lactylate ("SSL" HLB 21), sucrose monostearate, HLB 16; sucrose monolaurate, sodium oleate HLB 18, calcium stearoyl lactylate; sodium oleate (HLB 18); polyoxyethylene-20-sorbitan monopalmitate (HLB 15.6); polyoxyethylene-40-stearate (HLB 16.9); Tween 20 (POE (20) sorbitan monolaurate) (HLB of about 16.7), polyoxyethylene sorbitan monopalmitate, and polyoxyethylene stearic acid monoester. Additionally, Emultop™ may be used.

The most preferred non-sterol emulsifier for use within the scope of the present invention is SSL, which can be made by combining lactic acid and stearic acid, and then reacting the result with sodium hydroxide or calcium hydroxide to make the sodium or calcium salt. It is used as an emulsifier in processed foods and as a dough strengthener in baked goods. Heretofore, it has not been discovered that in combining high HLB emulsifiers with sterols or stanols, the widespread and attendant problems of waxiness and guminess is favourably addressed.

Within the scope of the present invention, there is provided a method of reducing and/or preventing the unpleasant organoleptic and sensory qualities (including, but not limited to guminess and waxiness) of the incorporation of sterols and stanols and mixtures thereof into foods, beverages or nutraceuticals which comprises: a) preparing a premix of one or more sterols and/or stanols with one or more high HLB non-sterol emulsifiers; b) adding said premix into the desired food, beverage or nutraceutical during or after manufacture. In the alternative, but also within the scope of the present invention, the high HLB non-sterol emulsifier and sterol/stanols may be added not as a premix, but as components of the desired food, beverage or nutraceutical matrix during manufacture i.e. not being formed into a separate premix prior to incorporation. It is also contemplated that the selected high HLB non-sterol emulsifier and one or more sterol/stanols may be incorporated into sachets which may be made with specific colourings and/or flavourings and/or sweeteners for use, for example, as a powder to be add to water (by a consumer) to form healthful beverages.

Similarly, it has not been previously appreciated that there are measurable and key advantages in combining sterols/stanols and high HLB emulsifiers to achieve anti-microbial effects in foods and beverages. These are critically important advantages with multiple benefits with respect to the maintenance of food product quality. While each benefit individually is considered important, it is the combination of these effects which will impact the food industry most significantly. By way of this invention, there is provided a means to reduce microbial growth in food products by agents which are non-toxic, which are "naturally derived" and which do not negatively affect (and in fact positively enhances) any of the organoleptic properties of the food product.

Additional, optional components may be present in the compositions, premixes and sachets and include stabilizers, thickeners, flavourings, vitamins, sweeteners, salt, proteins (dairy, soya etc. . . . ) and colouring agents. Preferably, within the scope of the present invention, the high HLB non-sterol emulsifier and sterol/stanols is combined with one or more hydrocolloids. In a preferred form, the hydrocolloid is carrageenan, most preferably in kappa form. In a further preferred form, modified starch is present in the compositions, premixes and sachets of the present invention, the most preferred being maltodextrin.

Preferably the compositions, premixes and sachets of the present invention comprise one or more sterols and or stanols, one or more high HLB non-sterol emulsifiers and carrageenan. In the further preferred form of the present invention, the compositions, premixes and sachets comprise one or more sterols and or stanols, SSL and carrageenan. In the further preferred form of the present invention, the compositions, premixes and sachets comprise one or more sterols and or stanols, SSL, carrageenan and maltodextrin.

This premix or the compositions of the high HLB non-sterol emulsifier and sterol/stanols may be added to a wide variety of foods, beverages and nutraceuticals. These include, but are not limited to the following:

1) Fat-Based Products—such as margarines, spreads (dairy and non-dairy), peanut butter, peanut spreads, mayonnaise (many of which are formed using emulsions), shortenings, cooking and frying oils and dressings;

2) Grain-based Goods—for example, bread and pastas, cookies, pastries, whether these goods are cooked, baked or otherwise processed;

3) Confectioneries—such as chocolate, candies, chewing gum, desserts, non-dairy toppings (for example Cool Whip™), sorbets, dairy and non-dairy shakes, icings and other fillings;

4) Beverages-fruit juices; dietary supplement and meal replacement drinks such as those sold under the trade-marks Boost™ and Ensure™; and any drinkable emulsions which contain added fat or oils;

5) Miscellaneous Products—including processed foods such as soups, pre-prepared pasta sauces, pre-formed meals and the like; and 6) Dairy Products—butter, dairy spreads, cheeses, yoghurts, yoghurt drinks and beverages such as shakes and any emulsions containing added fat or oils.

The further, more detailed list may assist those skilled in the art in identifying various food products into which the premix and compositions of the present invention may be used advantageously.

1. Dairy products
   a. Milk
   b. Milk condensed
   c. Milk evaporated
   d. Milk powder
   e. Yogurt (stirred, set, dried etc.)
   f. Yogurt drink
   g. Other fermented milk products
   h. Smoothies
   i. Cheese
      i. Hard cheese (Mozzarella, cheddar etc)
      ii. Soft cheese (Cottage, cream, ricotta etc.
   j. Cream and cream substitute (fluid and powder)
   k. Creamers and creamer analogs (fluid and powder)
   l. Cheese analogs
   m. Eggnog
   n. Dairy dips
   o. Dairy pre-mix (with milk powder, or starch, or protein isolate)
2. Deserts
   a. Ice cream
   b. Ice milk
   c. Frozen yogurt, sherbet
   d. Frozen fruit juices
   e. Sundae
   f. Puddings
3. Eggs
   a. Egg powder
   b. Egg substitutes 4. Cereals
   a. Cereal bars
   b. Cereal-fruit bars
   c. Breakfast cereals
5. Baking products
   a. Bread (whole meal, rye, wheat etc.)
   b. Crisp bread
   c. Biscuits\rolls
   d. Croissants
   e. Bagels
   f. Tortillas
   g. Bread sticks
   h. Crackers
   i. Toasts (e.g. melba)
   j. Cookies
   k. Muffins
   l. Brownies
   m. Doughnuts
   n. Cakes
   o. Pancakes
   p. Waffles
   q. Pizza crust
   r. Pastries and pies (Puff, Danish etc.)
   s. Cake mixes
   t. Bread mixes
   u. Pastas
      i. Durum pasta
      ii. Rice pasta
      iii. Vegetable pasta
      iv. Dry, ready-to-eat pastas
      v. Chow mein noodles
      vi. Other noodles
6. Fats and Oils
   a. Low fat vegetable spreads
   b. Salad dressings
   c. Mayonnaise
   d. Butter replacement
   e. Non-dairy whiteners (creamers)
7. Juices
   a. Fruit juices
   b. Vegetable juices
   c. Nectars
   d. Fruit and vegetable drinks
8. Beverages
   a. Carbonated and non-carbonated drinks
   b. Herbal and non-herbal teas
9. Confectionary and sweets
   a. Hard and soft candies
   b. Chewable candies
   c. Chocolates and chocolate candies
   d. Marshmallows
   e. Jams, Jellies etc
   f. Fruit bars
10. Snacks
    a. Chips
    b. Pretzels
    c. Fruit-based snacks
    d. Grain-based snacks
    e. Extruded snacks
11. Soups
    a. Regular soups
    b. Condensed soups
    c. Dry pre-mix soups
12. Sauces, Dips, Gravies and Condiments
    a. Sauce (pasta sauce, pizza sauce, cheese sauce, Hollandaise, tartar, sweet and sour, fish sauce etc.)
    b. Gravies (Mushroom, meat etc.)
    c. Dips (dairy-based. Non-dairy based, salsa, bean dip etc.)
    d. Condiments (catsup, marinade, steak sauce, soy, teriyaki etc.)
    e. Relishes (vegetable e.g pickles, fruits e.g. cranberry, avocado)
13. Sachet for ready-to-drink
14. Meal replacements
    a. Snack bars
    b. Energy bars
    c. Drinks (eg. Boost, shake)
    d. Dry mixes
    e. Protein concentrates (dairy, non-dairy)
15. Chewing gum
16. Dietary Supplements
    a. Supplement bars
    b. Supplement drinks
    c. Chews
    d. Tablets, soft gel capsules etc.

Although it is not clearly understood why or by what mechanism, the high HLB emulsifier clearly improves the mouth feel (bitterness, texture, grainy feel) of phytosterol in a variety of media including in aqueous dispersions or in the aqueous phase of an emulsion. The method and composition of the present invention makes it possible to include phytosterols at effective levels in the aqueous phase of a broad range of comestible products, thereby opening up new formulation opportunities, such as low fat and fat free formulations The means by which the phytosterol/high HLB emulsifier composition will be added to, or incorporated in or on the food product will depend largely on the specific type of food product. It is anticipated that such incorporation will occur at the time of manufacture of the food product, although in many cases, later addition may also be possible.

In a preferred mode for many food products, the sterols/stanols are blended with the high HLB emulsifier and then coated (or microencapsulated) with another food grade material. This blending and subsequent coating can be achieved by spray drying or a host of other conventional means. These means include spray drying, fluid bed coating, wet granulation etc.

Many types of coating materials are suitable:

TABLE 1

Types of coating materials used to produce microcapsules

| Class of coating material | Specific types of coatings |
| --- | --- |
| Gums | Gum arabic, agar, sodium alginate, carageenan |
| Carbohydrates | Starches, dextran, sucrose, corn syrup, modified starches |
| Celluloses | Carboxymethylcellulose, hydroxypropylmethyl cellulose (HPMC), methycellulose, ethylcellulose, nitrocellulose, acetylcellulose, cellulose acetate-phthalate, cellulose acetate-butylate-phthalate |
| Lipids | Wax, paraffin, tristearin, stearic acid, monoglycerides, diglycerides, beeswax, oils, fats, hardened oils |
| Inorganic materials | Calcium sulfate, silicates, clays |
| Proteins | Gluten, casein, gelatin, albumin |

There are many methods to encapsulate food products, and many may be used successfully herein to coat the sterol/stanol/high HLB emulsifier blend. Spray drying is the most used encapsulation method, and is the least expensive. An emulsion is formed between the core and coating, and the emulsion is dried in a hot air drying chamber. This process allows the coating material to trap the core material.

The microencapsulation process occurs in a spray dryer, and the process generally involves three steps: first, preparation of the emulsion or dispersion to be processed; second, homogenization of the dispersion; and the last step is atomization of the mass in the drying chamber. Dispersing the active material into the coating material, which is immiscible, makes the dispersion. An emulsifier is then added to the dispersion and the dispersion is then heated and homogenized. This homogenization creates an oil-in-water type of an emulsion. The emulsion is then atomized into a heated air stream supplied to the drying chamber. These atomized particles assume a spherical shape as they fall through the gaseous medium, and the material is encased in the aqueous phase. The rapid removal of water from the coating material by the cyclone keeps the core material below 100° C., even if the temperature in the drying chamber is much greater.

In a most preferred mode, the sterols/stanols are blended with a high HLB emulsifier such as SSL, and then coated with starch, most preferably modified starch.

In a preferred mode, the sterols/stanols are a powdered composition comprising 30-75% sitosterol, 2-10% campesterol, 5-20% sitostanol, 2-10 campestanol. In order to facilitate exposure to bile salts, phytosterols are preferably administered in very finely divided form. The smaller the particle size the better the dispersion obtained, and the less "sandy" the feeling in the mouth. A low mean particle size (e.g. between 10 and 100 microns, preferably lower than 50 microns) can be achieved by milling and sieving, or by following the "impact forces" technique described in WO 00/45648.

To assist in the incorporation into various food products, the phytosterol/high HLB emulsifier composition may be solubilized or dispersed in emulsions, suspensions, solutions, solid dispersions, macroemulsions, microemulsions, self-emulsifying systems, hydrated lipid systems, formed into inclusion complexations with cyclodextrins or bile salts or formed into hydrotopes.

In another preferred embodiment of the invention the phytosterol/high HLB emulsifier composition is primarily localized to the water phase of an emulsion. The emulsified fat based products created in accordance with the invention may be oil-in-water (o/w, or water continuous) or water-in-oil (w/o, or oil continuous) emulsions according to which specific emulsifiers may be are selected for use in preparing the emulsion. Water in oil (w/o or oil continuous emulsions) are most preferred. For the manufacture of enteral pharmaceutical and nutritional products, such as edible spreads, margarines, and icings/frostings it is usual to generate a w/o emulsion.

EXAMPLES

The following examples are provided by way of illustration, and are not intended to be limiting to the scope of the invention.

Example 1

Dairy Beverages

| Formulation | % |
|---|---|
| Milk (Skim, Homo, 1 or 2% M.F.) | 98.96 |
| Modified Tapioca Starch ("Instant Textra" - Nacan) | 0.5 |
| SSL ("K-Emplex" - AIC) | 0.3 |
| Reducol ™ (Phytosource) (Reducol is a compostion of phytosterols and phytostanols) | 0.24 |

Various formulations having ratio Reducol™:SSL from 1:1.25 (from example: 0.24% Reducol™ & 0.3% SSL) to 3:1 (for example: 1.8% Reducol™ & 0.6% SSL). Reducol is a mixture of phytosterols and phytostanols (primarily sitosterol, sitostanol, campesterol, campestanol) extracted from forestry by-products.

Procedure
1. Warm up the milk to 45° C.
2. Add the pre-blended starch, Reducol™ and SSL
3. Homogenize using one/two stages homogenizer at 2,000/2500 psi
4. Pasteurize at 82° C. for 3½ minute (or other approved combination of time and temperature)
5. Cool immediately to 4-10° C.
6. Package Example 2

Fat Spread (Dairy)

| Formulation | % |
|---|---|
| Fat Phase | |
| Canola Oil ('Clear Valley 65' - Cargill) | 35.046 |
| Sterol Ester (Wood Sterols) | 5.025 |
| Solid Fat (Magfat CAF 50, Premium Vegetable Oils) | 2.000 |
| Flavour (BuFlaCon 15X fat, DairyChem) | 0.020 |
| Mono- and Di-glycerides (MONO-DI HV 60, Danisco) | 0.300 |
| Lecithin (Leciprime 1800 IPM, Cargill) | 0.080 |
| Beta Carotene (22% HS HP, BASF) | 0.002 |
| Water Phase | |
| Water | 47.090 |
| Reducol ™ (Phytosource) | 4.743 |
| Buttermilk Powder | 1.000 |
| Pectin (Grindsted Pectin RS 400, Danisco) | 0.500 |
| Starch (EmTex 12688, Cerestar) | 2.400 |
| SSL (K Emplex 268508104, AIC) | 0.200 |
| Potassium Sorbate (Kenko Reipu Sorbate Co.) | 0.048 |
| Flavour DairyChem (BuFlaCon #200 NND) | 0.040 |
| Citric acid (to pH 4.8) (ADM) | 0.006 |
| Salt (Morton) | 1.500 |

Comments
Various formulations having ratio Reducol™:SSL from 25:1 (for example: Reducol™ 7.5% & SSL 0.3%) to 75:1 (for example: Reducol™ 7.5% & SSL 0.1%)
  potassium sorbate content=0-0.048%
  salt content=0.7-1.5%

Procedure
1. Weigh Reducol™, buttermilk powder, starch, SSL, potassium sorbate, citric acid and salt, to create a homogenous powder pre-mix
2. Heat the water to 85° C. and slowly add pectin, stirring with a high shear mixer until solution is clear. Allow to hydrate for 5 minutes
3. Slowly, add powder pre-mix to the pectin solution, and stir well until uniform, using a high shear mixer (make sure there are no clumps left in suspension)

4. Add the water soluble flavour
5. Pasteurize at 60° C. for 15 minutes (or a different combination of time and temperature)
6. Weigh canola oil and add it in a swept surface emulsion tank. Heat the oil to 85° C.
7. Add solid fat and keep mixing until it is completely melted
8. Add sterol esters, while mixing continuously
9. After the oil phase becomes clear, add mono & di-glycerides, lecithin, fat soluble flavour and colour, while mixing until homogenous
10. Start adding the water phase into the fat phase, while maintaining the temperature at 65-70° C. and mixing continuously until the emulsion is uniform
11. Pump the emulsified mixture into the swept surface heat exchanger and pinworker
12. Package

Example 3

Fat Spread (Non-Dairy)

| Formulation | % |
| --- | --- |
| Fat Phase | |
| Canola Oil ('Clear Valley 65' - Cargill) | 35.046 |
| Sterol Ester (Wood Sterols) | 5.025 |
| Solid Fat (Magfat CAF 50, Premium Vegetable Oils) | 2.000 |
| Flavour (BuFlaCon 15X fat, DairyChem) | 0.020 |
| Mono- and Di-glycerides (MONO-DI HV 60, Danisco) | 0.300 |
| Lecithin (Leciprime 1800 IPM, Cargill) | 0.080 |
| Beta Carotene (22% HS HP, BASF) | 0.002 |
| Water Phase | |
| Water | 48.090 |
| Reducol ™ (Phytosource) | 4.743 |
| Pectin (Grindsted Pectin RS 400, Danisco) | 0.500 |
| Starch (EmTex 12688, Cerestar) | 2.400 |
| SSL (K Emplex 268508104, AIC) | 0.200 |
| Potassium Sorbate (Kenko Reipu Sorbate Co.) | 0.048 |
| Flavour DairyChem (BuFlaCon #200 NND) | 0.040 |
| Citric acid (to pH 4.8) (ADM) | 0.006 |
| Salt (Morton) | 1.500 |

Comments
 Various formulations having ratio Reduco™ 1:SSL from 25:1 (for example: Reducol™ 7.5% & SSL 0.3%) to 75:1 (for example: Reducol™ 7.5% & SSL 0.1%)
 potassium sorbate content=0-0.048%
 salt content=0.7-1.5%

Procedure
1. Weigh Reducol™, starch, SSL, potassium sorbate, citric acid and salt, to create a homogenous powder pre-mix
2. Heat the water to 85° C. and slowly add pectin, stirring with a high shear mixer until solution is clear. Allow to hydrate for 5 minutes
3. Slowly, add powder pre-mix to the pectin solution, and stir well until uniform, using a high shear mixer (make sure there are no clumps left in suspension)
4. Add the water soluble flavour
5. Pasteurize at 60° C. for 15 minutes (or a different combination of time and temperature)
6. Weigh canola oil and add it in a swept surface emulsion tank. Heat the oil to 85° C.
7. Add solid fat and keep mixing until it is completely melted
8. Add sterol esters, while mixing continuously
9. After the oil phase becomes clear, add mono & di-glycerides, lecithin, fat soluble flavour and colour, while mixing until homogenous
10. Start adding the water phase into the fat phase, while maintaining the temperature at 65-70° C. and mixing continuously until the emulsion is uniform
11. Pump the emulsified mixture into the swept surface heat exchanger and pinworker
12. Package

Example 4

Pre-Mixes

| Formulation | % |
| --- | --- |
| Water | 80.54 |
| Reducol | 11.00 |
| SSL (K Emplex 268508104, AIC) | 0.30 |
| Carageenan (CM 750, Food Specialties) | 0.016 |
| Maltodextrin (01960, Cerestar/Cargill) | 8.14 |

Comments
 Various formulations with ratio Reducol™:SSL from 10:1 (for example: Reducol™ 3% & SSL 0.3%) to 43.3:1 (for example: Reducol™ 13% & SSL 0.3%)
 Various formulations with ratio Reducol™:Carrageenan from 187.5:1 (for example: Reducol™ 3% & Carrageenan 0.016%) to 812.5:1 (for example: Reducol™ 13% & Carrageenan 0.016%)
 Various formulations with ratio SSL:Carrageenan 18.75:1 (for example: SSL 0.3% & Carrageenan 0.016%)

Procedure
1. Weigh Reducol™, maltodextrin and SSL and mix to create a homogenous powder pre-mix
2. Heat a small portion of water (~1/10 of the total) to 85° C. and add carrageenan, while mixing thoroughly until fully dissolved
3. Heat the rest of water to 55-60° C. and slowly add powder pre-mix, stirring until homogenous
4. Add carrageenan suspension to the rest of the water and mix well
5. Homogenize using either a Gaulin or a Turrax homogenizer, depending on the thickness of the final suspension
6. Spray-dry at T inlet=210-230° C. and T outlet=75-105° C., with a speed of 8-15 rpm (Equipment used: A/S Necro Niro Atomizer, Copenhagen, Denmark, Type "Minor" M-02/a; and MasterFlex Digi-Staltic Pump, Model 7525-34, Bamant Co., Barrington, Ill.)
7. Packaging The premix obtained above is water dispersible, as opposed to free phytosterols/phytostanols (such as Reducol™) alone, as they are completely hydrophobic). This premix can therefore be incorporated in a variety of liquid food and beverage matrices such as, for example: milk and milk-based beverages, fruit juices, water, etc. . . .

Example 5

Orange Juice Drink

| Formulation | |
|---|---|
| Pure Orange Juice (not from concentrate, no pulp) | 99.57% |
| Dispersible Reducol ™ Powder (containing SSL)* | 0.43% |

Procedure
1. Pour juice into a stainless steel container and bring it to room temperature (~20° C.)
2. Gradually, add the dispersible Reducol™, while mixing for 1-2 minutes until all powder is hydrated
3. Homogenize at 2800 psi first stage and 2600 psi second stage (Equipment: Gaulin Homogenizer)
4. Pasteurize the juice drink to ~65° C. for 30 minutes (or other viable combination of time and temperature).
5. Cool the drink to 10° C. and package

| *Formulation of Dispersible Reducol ™ Powder | |
|---|---|
| | % |
| Water | 80.54 |
| Reducol | 11.00 |
| SSL (K Emplex 268508104, AIC) | 0.30 |
| Carageenan (CM 750, Food Specialties) | 0.016 |
| Maltodextrin (01960, Cerestar/Cargill) | 8.14 |

Comments

Various ratios can be used:
a) Reducol™:SSL from 10:1 (for example Reducol™ 3% & SSL 0.3%) to 43.3:1 (for example: Reducol™ 13% & SSL 0.3%;)
b) Reducol™:Carrageenan from 187.5:1 (for example: Reducol™ 3% & Carrageenan 0.016%) to 812.5:1 (for example: Reducol™ 13% & Carrageenan 0.016%)
c) SSL:Carrageenan 18.75:1 (for example: SSL 0.3% & Carrageenan 0.016%).

One particular advantage of this formulation is the fact that it significantly simplifies the procedure of preparation of the orange juice drink, eliminating the steps required to dissolve the stabilizers and disperse the Reducol™ uniformly throughout the liquid.

Example 6

Sachets

| Sachet | |
|---|---|
| Ingredients | % |
| Water | 73.435 |
| Reducol | 11.000 |
| SSL (K Emplex 268508104, AIC) | 0.300 |
| Carageenan (CM 750, Food Specialties) | 0.0160 |
| Maltodextrin (01960, Cerestar/Cargill) | 8.140 |

| Sachet | |
|---|---|
| Ingredients | % |
| Fructose | 6.000 |
| Flavour | 0.500 |
| Citric acid | 0.600 |
| Colour | 0.005 |

Procedure
1. Weigh Reducol™, maltodextrin, fructose, flavour, citric acid, colour and SSL and mix to create a homogenous powder pre-mix
2. Heat a small portion of water (~1/10 of the total) to 85° C. and add carrageenan, while mixing thoroughly until fully dissolved
3. Heat the rest of water to 55-60° C. and slowly add powder pre-mix, stirring until homogenous
4. Add carrageenan suspension to the rest of the water and mix well
5. Homogenize using either a Gaulin or a Turrax homogenizer, depending on the thickness of the final suspension
6. Spray-dry at T inlet=210-230° C. and T outlet=75-105° C., with a speed of 8-15 rpm (Equipment used: A/S Necro Niro Atomizer, Copenhagen, Denmark, Type "Minor" M-02/a; and MasterFlex Digi-Staltic Pump, Model 7525-34, Barnant Co., Barrington, Ill.)
7. Package so that the final amount of spray-dried powder to provide either 0.6 g or 1.8 g of Reducol™ per serving Comments Sachets made with the following concentration ranges:
Reducol range 3-13%
SSL range 0.1-0.5%

Example 7

Granola Bars (Crunchy)

| Formulation | % |
|---|---|
| Cereal Mix | |
| Quick Oats | 27.780 |
| Crisp Rice | 5.780 |
| Flaxseed, ground | 6.000 |
| All-Bran ™ Buds (Kellogg's) | 12.400 |
| Reducol | 3.610 |
| Salt | 0.190 |
| Sodium Bicarbonate | 0.190 |
| Binder | |
| White Sugar | 7.580 |
| Canola Oil | 8.400 |
| Honey | 12.600 |
| Molasses | 9.640 |
| Vanilla | 2.020 |
| Reducol | 3.610 |
| SSL (K Emplex 268508104, AIC) | 0.200 |

Procedure
1. Preheat oven to 325 C
2. Mix cereals and half of Reducol (i.e. corresponding to the cereal portion) in a large bowl
3. Melt remaining Reducol (i.e. corresponding to the binder portion) in oil bringing to a boil. Take pot from heat source, add honey, molasses, sugar and SSL, and mix well, while binder is cooling down and becomes thicker
4. Add vanilla to the binder just before mixing with the cereal mixture and homogenize with a hand mixer
5. Add binder to cereal mixture
6. Transfer the granola mix to a baking sheet, spread evenly and press uniformly; cut the bars
7. Bake at 325° F. for 15-20 minutes in the regular oven or ~10-15 minutes in the convection oven
8. Cool down the bars by keeping them at room temperature or in the cooler for 30-60 minutes
9. Wrap the bars Comments Free sterol range: 2-8%

Example 8

Granola Bars (Chewy)

| Formulation | % |
| --- | --- |
| Cereal Mix | |
| Quick Oats | 32.970 |
| Crisp Rice | 13.700 |
| Coconut | 8.000 |
| Reducol ™ | 3.600 |
| Binder | |
| Canola Oil | 3.330 |
| White Sugar | 7.500 |
| Molasses | 3.000 |
| Corn Syrup | 28.500 |
| Salt | 0.200 |
| Vanilla Flavour | 0.800 |
| SSL (K Emplex 268508104, AIC) | 0.200 |
| Reducol ™ | 3.600 |

Procedure
1. Mix cereals and half of Reducol (i.e. corresponding to the cereal portion) in a large bowl
2. Melt the other half of Reducol (i.e. corresponding to the binder portion) in oil bringing to a boil. Take pot from heat source, add honey, molasses, SSL and sugar, and mix well, while binder is cooling down and becomes thicker
3. Add flavour to the binder and mix well
4. Add binder to cereal mixture while hot (60-70 C), otherwise it will be too tough and will not allow mixing
5. Cut the bars, then cool them down and pack Comments Free sterol range: 2-8%

SSL range 0.1-0.5%

Depending on total sterol concentration, Reducol™ may be added either to the binder phase entirely (up to ~6%), or may be split between the two phases

Example 9

Premix

Formulation
Water
Reducol
SSL (K Emplex 268508104, AIC)
The ingredients are prepared as per example 4.

Example 10

Premix

Formulation
Water
sitostanol
calcium stearoyl lactylate
The ingredients are prepared as per example 4.

Example 11

Dairy Beverages

| Formulation | % |
| --- | --- |
| Milk (Skim, Homo, 1 or 2% M.F.) | 98.96 |
| Modified Tapioca Starch ("Instant Textra" - Nacan) | 0.5 |
| calcium stearoyl lactylate | 0.3 |
| Reducol ™ (Phytosource) | 0.24 |

The ingredients are prepared as per example 1.

Example 12

Orange Juice Drink

| Formulation | |
| --- | --- |
| Pure Orange Juice (not from concentrate, no pulp) | 99.57% |
| Dispersible Reducol ™ Powder (containing SSL)* | 0.43% |

Procedure—as Per Example 5

| *Formulation of Dispersible Reducol ™ Powder | % |
| --- | --- |
| Water | 80.54 |
| Reducol | 11.00 |
| SSL (K Emplex 268508104, AIC) | 0.50 |
| Carageenan (CM 750, Food Specialties) | 0.016 |
| Maltodextrin (01960, Cerestar/Cargill) | 7.96 |

Example 13

Spray Drying

Manufacturing Process Description—Reducol Plus 200

Weighed quantities of Reducol and sodium stearoyl lactylate ("SSL") were added to the fluid bed spray granulation unit. The unit was run with air circulation only to blend the two ingredients. The Reducol-SSL blend was then spray coated and dried in the unit with a metered quantity of a modified corn starch ("Pure-Cote") dissolved in water. This results in coated agglomerates of the original dry ingredients that have better handling and dispersing characteristics.

The resultant product "Reducol Plus 200" contains 2% SSL, 5% Pure-Cote and 93% Reducol.

Example 14

Spray Drying

Manufacturing Process Description—Reducol Plus 500

Weighed quantities of Reducol and sodium stearoyl lactylate ("SSL") were added to the fluid bed spray granulation unit. The unit was run with air circulation only to blend the two ingredients. The Reducol-SSL blend was then spray coated and dried in the unit with a metered quantity of a modified corn starch ("Pure-Cote") dissolved in water. This results in coated agglomerates of the original dry ingredients that have better handling and dispersing characteristics.

The resultant product "Reducol Plus 500" contains 5% SSL, 5% Pure-Cote and 93% Reducol.

Example 15

Spray Drying

Manufacturing Process Description—

Weighed quantities of Reducol and calcium stearoyl lactylate (CSL) are added to the fluid bed spray granulation unit. The unit is run with air circulation only to blend the two ingredients. The Reducol-CSL blend is then spray coated and dried in the unit with a metered quantity of a modified corn starch ("Pure-Cote") dissolved in water. This results in coated agglomerates of the original dry ingredients that have better handling and dispersing characteristics.

The resultant product "Reducol Plus 200" contains 2% CSL, 5% Pure-Cote and 93% Reducol.

Example 16

Anti-Microbial Effects 10 ml portions freshly pasteurized milk containing 0.03% w/v SSL (ADM Arkady, Olathe, Kans.) was added to a series of sterile test tubes and incubated at 4-7° for 14 d. A similar protocol was prepared using a 57% dispersible phytosterol preparation (0.03% SSL plus Reducol™). The SPC of milk stored at 4-7° C. was determined periodically over 2 weeks.

Figure 2:
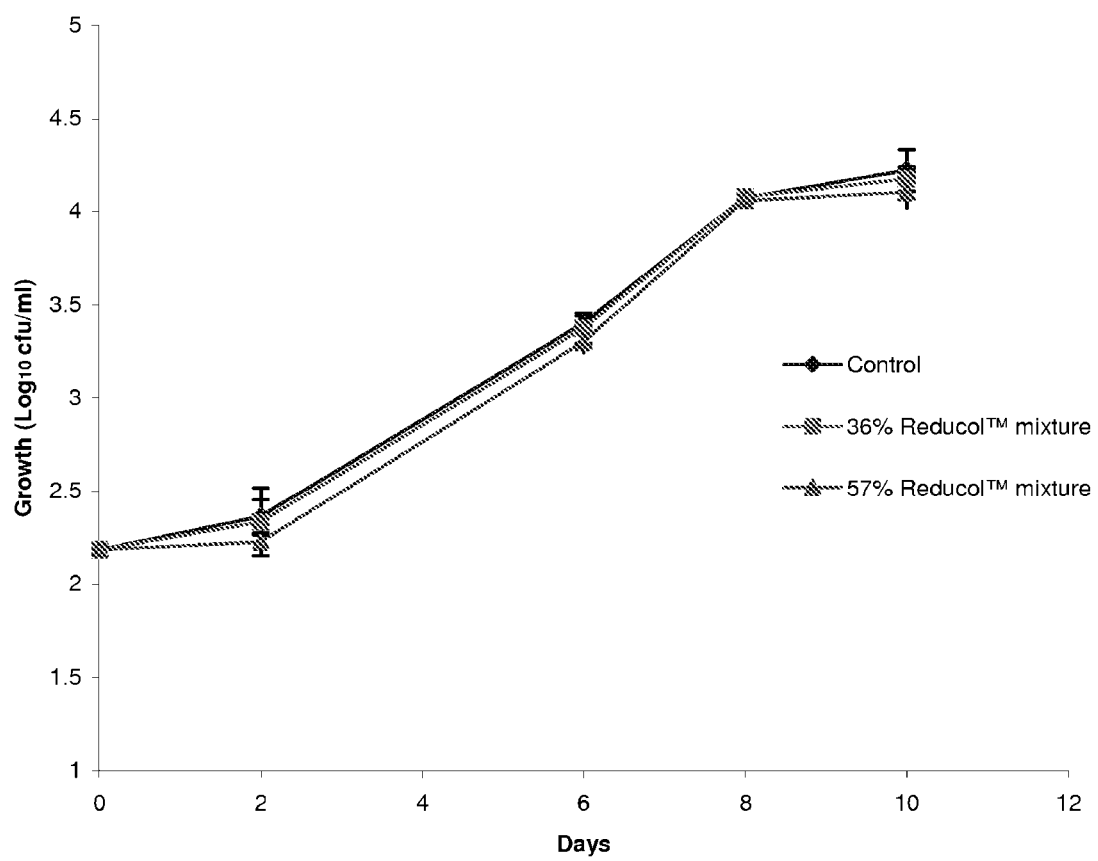
FIG. 2 is a graph showing the effect of dispersible Reducol™ mixture on the growth of P. fluorescens in 1% m.f. milk stored at 4° C. Values[1] are means of triplicate samples each performed in duplicate (n=6). Error bars represent standard deviation of means.
Figure 3:
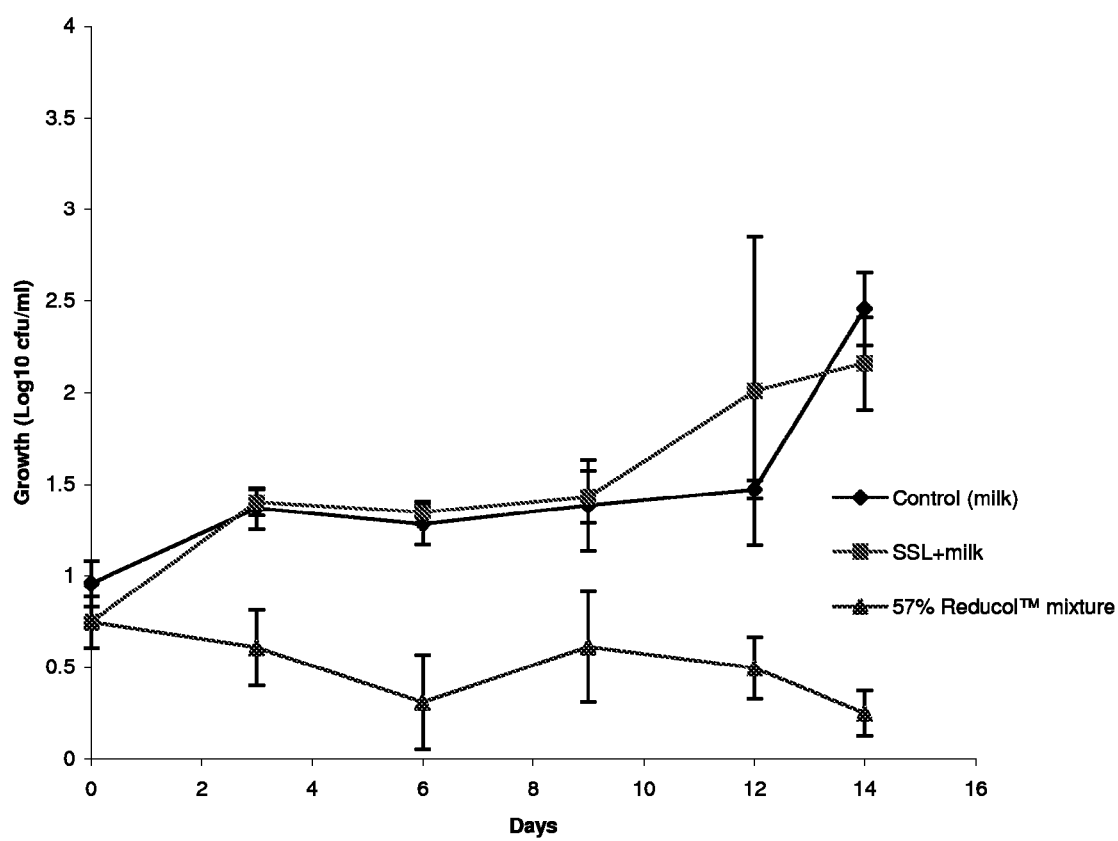
FIG. 3 is a graph showing the effect of Sodium stearoyl lactylate (SSL) and a phytosterol mixture on the SPC of 1% m.f. milk stored at 4-7° C. Values[1] are means of triplicate samples each conducted in triplicate (n=6). Error bars represent standard deviation of means.

The results are shown in FIGS. 1-3.

As shown in FIG. 1 the SPC time course profile of milk with and without the addition of SSL remained similar. By 14d the SPC in both treatments exceeded 2 $\log_{10}$ cfu/ml. In comparison t milk containing the Reducol™ mixture remained relatively constant$\leq$1 $\log_{10}$ cfu/ml throughout the entire storage period.

The use of a dispersible blend according to the present invention, of Reducol™ containing maltodextrin, carrageenan and sodium stearoyl lactylate did, however, exhibit a long-term (up to 23 d) inhibitory effect on the SPC and growth of psychrotrophs in milk maintained at 4° C. Overall, it is hypothesized that the antimicrobial activity of the dispersibile Reducol™ mixture may be due to its increased solubility in milk. For example, during treatment regular Reducol™ separated, much of it floating to the top of the milk after a few hours of incubation. Since SSL is an anionic lipophilic emulsifier (Ultra Chemical Inc, 2000) its ability to ostensibly disperse Reducol™ would be advantageous as the efficacy of hydrophobic antimicrobials is dependant on their ability to travel across the aqueous phase of a solution in order to interact with the membrane of the target organism.

In this study, it is important to note that the use of SSL without Reducol™ did not appear to have any effect on the SPC in milk and therefore should not be considered a major antimicrobial. Likewise, the sterols/stanol alone did not achieve the desired effects. Also, neither carrageenan nor maltodextrin exhibited antimicrobial effects on the SPC in milk (data not presented). The combination of sterols/stanols and dispersibility afforded by the high HLB emulsifier is required.

REFERENCES

1. Law M. R., Wald N. J., Wu., Hacksaw Z A., Bailey A.; Systemic underestimation of association between serum cholesterol concentration and ischemic heart disease in observational studies: Data from BUPA Study; *Br. Med. J.* 1994; 308:363-366
2. Law M. R., Wald N. J., Thompson S. G.; By how much and how quickly does reduction in serum cholesterol concentration lower risk of ischemic heart disease? *Br. Med. J.* 1994; 308:367-373
3. Kannel W B, Castelli W P, Gordon T et al. Lipoprotein cholesterol in the prediction of atherosclerotic disease: new perspectives based on the Framingham Heart Study. *Ann Intern Med.* 1995; 90:85-91
4. Singh B K, Mehta J L. Management of dyslipidemia in the primary prevention of coronary heart disease. *Curr Opin Cardiol.* 2002; 17:503-11
5. La Rosa J. C., Hunninghake D. Bush D. et al.; The cholesterol facts: A summary of the evidence relating to dietary fats, serum cholesterol and coronary heart disease: A joint statement by the American Heart Association and the National Heart, Lung and Blood Institute. *Circulation* 1990; 81:1721-1733
6. Havel R. J., Rapaport E. Drug Therapy: Management of Primary Hyperlipidemia. *New England Journal of Medicine,* 1995; 332:1491-1498
7. Kuccodkar et al.; Effects of plant sterols on cholesterol metabolism. *Atherosclerosis,* 1976; 23:239-248
8. Lees R. S., Lees A. M. Effects of sitosterol therapy on plasma lipid and lipoprotein concentrations. In: Greten H (Ed) Lipoprotein Metabolism. Springer-Verlag, Berlin, Heidelberg, N.Y., 1976:119-124
9. Lees A. M., Mok H. Y. I., Lees R. S., McCluskey M. A., Grundy S. M. Plant sterols as cholesterol-lowering agents: clinical trials in patients with hypercholesterolemia and studies of sterol balance. *Atherosclerosis* 1977; 28: 325-338

The invention claimed is:

1. A method of reducing and/or preventing the unpleasant organoleptic and sensory qualities (including guminess and waxiness) of the incorporation of sterols and stanols and mixtures thereof into foods, beverages or nutraceuticals which comprises:
    a) preparing a premix of one or more free sterols or free stanols or mixtures thereof with one or more high HLB non-sterol emulsifiers, each non-sterol emulsifier having an HLB value of greater than 14, wherein the non-sterol emulsifier and the free sterol or free stanol or mixtures thereof are first combined at ambient temperature, spray dried and then coated with starch to form the premix; and
    b) adding said premix into the desired food, beverage or nutraceutical during or after manufacturing.

2. The method of claim 1 wherein the sterol is selected from the group consisting of sitosterol, campesterol, stigmasterol, brassicasterol (including dihydrobrassicasterol), desmosterol, chalinosterol, poriferasterol, clionasterol, ergosterol, coprosterol, codisterol, isofucosterol, fucosterol, clerosterol, nervisterol, lathosterol, stellasterol, spinasterol, chondrillasterol, peposterol, avenasterol, isoavenasterol, fecosterol, and pollinastasterol.

3. The method of claim 1 wherein the stanol is selected from the group consisting of selected from the group consisting of sitostanol, campestanol, stigmastanol, brassicastanol (including dihydrobrassicastanol), desmostanol, chalinostanol, poriferastanol, clionastanol, ergostanol, coprostanol, codistanol, isofucostanol, fucostanol, clerostanol, nervistanol, lathostanol, stellastanol, spinastanol, chondrillastanol, pepostanol, avenastanol, isoavenastanol, fecostanol, and pollinastastanol.

4. The method of claim 1 wherein the sterol or stanol is a derivative selected from the group consisting of aliphatic esters, aromatic esters, phenolic acid esters, cinnamate esters, ferulate esters, glycosides, acylated glycosides and acylglycosides.

5. The method of claim 1 wherein the non-sterol emulsifier has an HLB value of equal to or greater than 17.

6. The method of claim 1 wherein the non-sterol emulsifier has an HLB value equal to or greater than 20.

7. The method of claim 1 wherein the non-sterol emulsifier is selected from the group consisting of sodium stearoyl lactylate ("SSL" HLB 21), sucrose monostearate, HLB 16; sucrose monolaurate, sodium oleate HLB 18, calcium stearoyl lactylate; sodium oleate (HLB 18); polyoxyethylene-20-sorbitan monopalmitate (HLB 15.6); polyoxyethylene-40-stearate (HLB 16.9); Tween 20 (POE (20) sorbitan monolaurate) (HLB of about 16.7), polyoxyethylene sorbitan monopalmitate, and polyoxyethylene stearic acid monoester.

8. The method of claim 1 wherein the emulsifier is sodium stearoyl lactylate.

9. A method for conferring anti-microbial properties to a food, beverage or nutraceutical comprising adding to said food, beverage or nutraceutical an anti-microbial effective amount of a composition for use in said foods, beverages or nutraceuticals, said composition comprising:
  (a) one or more non-sterol emulsifiers, each having an HLB value of greater than 14; and
  (b) one or more free sterols or free stanols or mixtures thereof, wherein the non-sterol emulsifier and the sterol or stanol or mixtures thereof are first combined at ambient temperature, spray dried and then coated with starch to form the composition that can be subsequently added to the foods, beverages or nutraceuticals.

* * * * *